(12) United States Patent
Haimer

(10) Patent No.: US 10,896,363 B2
(45) Date of Patent: Jan. 19, 2021

(54) DEVICE FOR SECURING A DATA CARRIER TO A TOOL HOLDER, TOOL HOLDER AND TOOL SYSTEM

(71) Applicant: Franz Haimer Maschinenbau KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 41 days.

(21) Appl. No.: 16/076,378

(22) PCT Filed: Feb. 13, 2017

(86) PCT No.: PCT/EP2017/053122
§ 371 (c)(1),
(2) Date: Aug. 8, 2018

(87) PCT Pub. No.: WO2017/140613
PCT Pub. Date: Aug. 24, 2017

(65) Prior Publication Data
US 2019/0039149 A1     Feb. 7, 2019

(30) Foreign Application Priority Data
Feb. 16, 2016   (DE) .................. 10 2016 102 692

(51) Int. Cl.
*G06K 19/077*     (2006.01)
*G06K 19/04*      (2006.01)
(Continued)

(52) U.S. Cl.
CPC ...... *G06K 19/07758* (2013.01); *B23B 31/006* (2013.01); *B23B 31/02* (2013.01); *G06K 19/04* (2013.01); *B23B 2231/10* (2013.01)

(58) Field of Classification Search
CPC ............. Y10T 483/132; Y10T 483/134; B23B 2231/10; G06K 19/00758
(Continued)

(56) References Cited

U.S. PATENT DOCUMENTS 5,202,680 A *  4/1993  Savage ................. E21B 17/006
                                                  175/40
6,347,292 B1 *  2/2002  Denny .................. E21B 17/006
                                                  702/188
(Continued)

FOREIGN PATENT DOCUMENTS

CN        204009984 U      12/2014
EP        3050654 A1       8/2016
(Continued)

OTHER PUBLICATIONS

EPO Machine Translation of CN204009984U—Zhang, Zhilong; "Petroleum drilling tool electronic label mounting structure", Dec. 10, 2014.*

(Continued)

*Primary Examiner* — Erica E Cadugan
*Assistant Examiner* — Michael Vitale
(74) *Attorney, Agent, or Firm* — Paul D. Bianco; Gary S. Winer; Fleit Intellectual Property Law

(57) ABSTRACT

A device for securing a data carrier to a tool holder is disclosed. In order to allow the data carrier to be easily secured to the tool holder in a reliable and permanent manner, the device includes a sleeve-shaped main body which has, at a first end, at least one projection projecting radially inwards and has, in the region of a second end opposite the first end, at least one projection projecting radially outwards.

9 Claims, 3 Drawing Sheets

(51) Int. Cl.
*B23B 31/02* (2006.01)
*B23B 31/00* (2006.01)

(58) Field of Classification Search
USPC .......................................................... 483/8–9
See application file for complete search history.

(56) References Cited

U.S. PATENT DOCUMENTS

| | | | |
|---|---|---|---|
| 9,443,185 B2* | 9/2016 | Pacheco | G06K 19/07728 |
| 2003/0156033 A1* | 8/2003 | Savage | G06K 19/04 340/572.8 |
| 2006/0179694 A1* | 8/2006 | Akins | G09F 3/00 40/299.01 |
| 2007/0124220 A1 | 5/2007 | Griggs et al. | |
| 2008/0303668 A1* | 12/2008 | Rohlf | G06K 19/041 340/572.1 |
| 2010/0171276 A1 | 7/2010 | Kaneko | |
| 2013/0057387 A1 | 3/2013 | Binmore | |
| 2013/0167703 A1* | 7/2013 | Chang | G06K 19/07758 83/698.11 |

FOREIGN PATENT DOCUMENTS

| | | | |
|---|---|---|---|
| JP | 04164555 A * | 6/1992 | |
| JP | 2000-343344 A | 12/2000 | |
| JP | 2004-202632 A | 7/2004 | |
| JP | 2011-045968 A | 3/2011 | |
| WO | 2007/024140 | 3/2007 | |
| WO | WO-2016120426 A1 * | 8/2016 | ............. B23C 5/006 |
| WO | WO-2016196781 A1 * | 12/2016 | ............. B23B 31/006 |

OTHER PUBLICATIONS

EPO Machine Translation of JP 2000343344 A—Nakajima et al., "Data Discriminating Chip and Fitting Method Therefor", Jun. 8, 2014.*
DIN 69873, published by Beuth Verlag, Jul. 1, 1993.
Hollow taper shank DIN 69893, https://www.haimer-usa.com/products/tool-holders/din-69893-hsk-a-hsk-e-hsk-f.html, printed Sep. 14, 2018.
International Search Report dated Apr. 13, 2017 for PCT/EP2017/053122 filed Feb. 13, 2017.
Written Opinion for PCT/EP2017/053122 filed Feb. 13, 2017.
Search result for German Patent Application No. 10 2016 102 692.1 dated Feb. 16, 2016.
International Preliminary Report on Patentability dated Aug. 21, 2018 with Written Opinion for PCT/EP2017/053122 filed Feb. 13, 2017.

* cited by examiner

DEVICE FOR SECURING A DATA CARRIER TO A TOOL HOLDER, TOOL HOLDER AND TOOL SYSTEM

FIELD OF THE INVENTION

The invention concerns a device for securing a data carrier to a tool holder, a tool holder, as well as a tool system.

BACKGROUND OF THE INVENTION

Tool holders having a standardized hole to accommodate a data carrier are known from DIN 69893, among others. There are corresponding standards for almost all tool holders with common interfaces between the tool holder and machine spindle. Such data carriers can be conceived especially for tool holders as standardized in DIN 69873. The tool holders can be identified fully automatically and additional measurement data can be recorded with these data carriers, which are designed, for example, as RFID chips. False assignments or missing tools are avoided and maximum tool use and high machine availability are thereby ensured. All tool-relevant data are stored without contact on the data carrier, which is firmly connected to the tool holder. Through automatic entry into the system memory all data are always correct, always up-to-date and can be continuously adapted during loading and unloading of the tool. The corresponding information about the tool is always available by electronic data transmission. The data carrier can also be used solely for individual marking of the tool. Additional data are then stored with reference to this marking in an external database. Securing such a data carrier, however, often poses problems. In the first place, positioning of the data carrier influences balance of the tool holder, precisely when the data carrier is mounted far away from the axis of rotation on the outside of the tool holder. On the other hand, if positioning appears close to the axis of rotation within the tool holder, the data carrier is often no longer readable due to shielding by the tool holder. On the other hand, the type of securing poses problems, since the frequently used glue connection can loosen over the service life of the tool holder so that the data carrier is flung out during operation, which represents a significant potential hazard. The quality of the glue connections is also subject to pronounced fluctuations, in addition to being dependent upon the performing personnel and the care with which gluing is carried out.

SUMMARY OF THE INVENTION

Use of the device according to the invention is of course not restricted to standardized holes and to tool holders according to DIN 69893. The device can be used with appropriate configuration with many variants of standardized and non-standardized tool holders on which data carriers with different shapes and sizes can be applied.

One aspect of the invention relates to a device that permits secure, permanent and simple fastening of a data carrier to a tool holder. In addition, a tool holder for such a device and a corresponding tool system are also to be devised.

Accordingly, a device, a tool holder, and a tool system are disclosed. Advantageous embodiments of the invention are also disclosed.

The device according to the invention is characterized in that it includes a sleeve-shaped main body, which has at least one projection projecting radially inwards on a first end and at least one projection projecting radially outwards in the area of a second end opposite the first end. This makes it possible, on the one hand, for the data carrier to be securely held in positive-locking fashion in the device by the projection projecting radially inwards and, on the other hand, for the device to be reliably and quickly secured in a corresponding data carrier holder in a tool holder by means of the projection projecting radially outwards.

The sleeve-shaped main body can have a circular cross section. However, it is also possible for the sleeve-shaped main body to have an angular, for example, triangular or square cross section, also with rounded corners, so that accurate positioning is made possible. The configuration of the inner cross section of the sleeve is then generally guided according to the shape of the data carrier being inserted, the outer cross section to the shape of the recess in the tool holder. The shape of the data carrier for use of the invention is therefore independent of the shape of the recess in the tool holder. The sleeve-shaped main body is then preferably formed in one piece.

In a preferred embodiment the projection projecting radially inwards can be formed by a peripheral annular ridge projecting radially inwards. The data carrier is thus supported over the entire periphery against the annular ridge so that particularly stable securing is achieved even at high speeds and the high centrifugal forces on the data carrier resulting therefrom. In addition, owing to the stable support over the entire periphery the annular ridge can also be designed particularly thin-walled, so that the data carrier with the device can be positioned in a tool holder close to the outer surface such that readout of the data carrier is facilitated. The data carrier is preferably only covered in a narrow outer edge region by projections, so that most of its surface remains free relative to a reading device.

In a particularly preferred embodiment, the at least one projection projecting radially outwards can be designed to be elastically movable in the radial direction. This makes it possible for the projection projecting radially outwards to be elastically deformed radially inwards during insertion into a corresponding data carrier receptacle in the tool holder and then to engage elastically in the desired holding position into a radially outwardly extending recess in the data carrier receptacle. A positive-locking connection between the device and the tool holder can thereby be achieved particularly quickly. After insertion, both the data carrier and the sleeve-shaped main body are fully recessed in the recess of the data carrier receptacle in the tool holder.

Several projections projecting radially outwards spaced from each other in the peripheral direction can preferably be provided in the area of the second end of the sleeve-shaped main body. The holding force of the device against the tool holder is thereby increased. The device is also positioned torsion-free by uniform spacing of the radially outwardly projecting projections in the peripheral direction.

With particular preference, each projection projecting radially outwards can be formed by a ridge projecting radially outwards running in the peripheral direction. A particularly large contact region between the device and the tool holder is thereby obtained, which results in particularly stable securing.

In an advantageous embodiment, slits can be provided in the sleeve-shaped main body in the peripheral direction between the projections projecting radially outwards. These slits can also preferably extend in the direction of the first end of the sleeve-shaped main body, starting from the second end of the sleeve-shaped main body. The elasticity of the projections projecting radially outwards is increased in the radial direction by the slits, so that the elasticity can be advantageously adjusted via the length of the slits.

A tool holder with a receptacle for a data carrier is also claimed, in which the receptacle is formed by an outward open recess in the tool holder. The tool holder is characterized in that the recess preferably has a notch extending laterally into the tool holder preferably close to, especially adjacent to a second end facing away from the open first end. A described device, which has a data carrier, can engage in this notch on the bottom of the recess with the projections projecting radially outwards, so that secure and stable fastening of the data carrier on the tool holder is guaranteed.

The notch can preferably be formed directly on the second inner end of the recess, i.e., on the bottom of the recess. However, it is also possible to position the recess [sic; notch] with a slight spacing from the second end of the recess.

In an advantageous embodiment the recess can be formed as a whole and is therefore particularly cost effective and precise to produce. However, it is also possible for the recess to have an angular cross section, especially triangular or square cross section also with rounded corners. A correspondingly designed device for securing of the data carrier can thereby be precisely mounted.

The notch extending laterally into the tool holder can be designed with particular advantage as an annular groove. A large-surface contact for corresponding projections projecting radially outwards is thereby created on the device for securing a data carrier, which permits particularly stable securing. It should be emphasized that such securing occurs in principle without threads and without additional means of fastening (adhesives, soldered connections). Additional sealing or securing with an appropriate glue, for example, for protection against soiling, however, is possible.

A tool system comprising a tool holder, a data carrier and a device for securing a data carrier on the tool holder is also claimed. The tool system is characterized in that the tool holder and the device for securing the data carrier on the tool holder are designed as described previously and hereafter.

In an advantageous embodiment, the tool system can also include a spacer element arranged between the second end of the recess in the tool holder and the data carrier. The spacer element, which is preferably designed as an elastic plastic element, especially as an O-ring, forces the data carrier into the front position in which the data carrier is positioned against the projection projecting radially inwards on the first end of the sleeve-shaped main body. Instead of the spacer element or in addition thereto, at least one hook-like element projecting radially inwards can also be provided on the sleeve-shaped main body, which holds the data carrier in the front position. This hook-like element is spaced from the projection projecting radially inwardly of the first end of the first sleeve-shaped main element so that the data carrier is securely held in between in positive-locking fashion. Like the at least one projection projecting radially outwards on the second end of the sleeve-shaped main body, the at least one hook-like element can also be designed elastic in the radial direction. This can be achieved, among other things, in that the slits in the sleeve-shaped main body extend at least to the hook-like element starting from the second end. Simple pre-mounting of the data carrier on the device is made possible by the hook-like element.

BRIEF DESCRIPTION OF THE DRAWINGS

Additional details and advantages of the invention are apparent from the following description of preferred embodiment example with reference to the drawings. In the drawings.

DETAILED DESCRIPTION OF THE INVENTION

Figure 1:
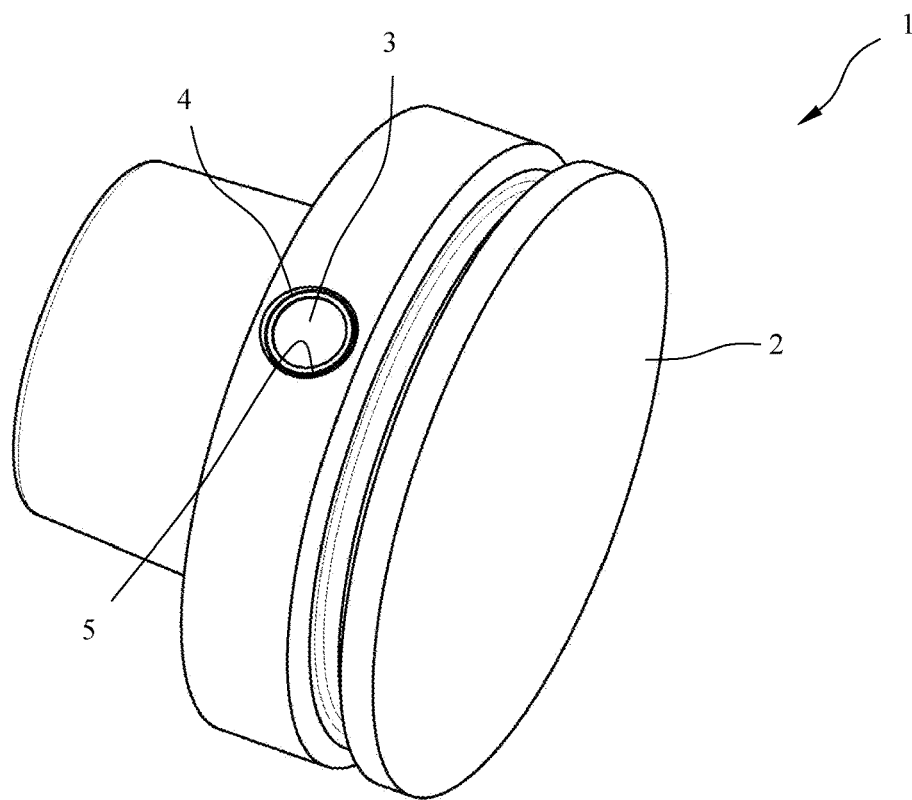
FIG. 1 shows a perspective view of a tool system comprising a tool holder, a data carrier as well as a device for securing a data carrier on the tool holder.

A perspective view of a tool system 1 comprising a partially depicted tool holder 2, data carrier 3 and a device 4 for securing the data carrier 3 to the tool holder 2 is shown in FIG. 1. The tool holder 2 is designed, for example, as a hollow shank taper and has a receptacle for the data carrier 3, which is formed by an outward open recess 5 and is configured as a hole. The data carrier 3 is held in recess 5 by means of device 4 in positive-locking fashion, as further explained with reference to the following figures. It should be noted that the tool holder 2 is only depicted schematically, the fastening section for a tool not being specifically shown.

Figure 2:
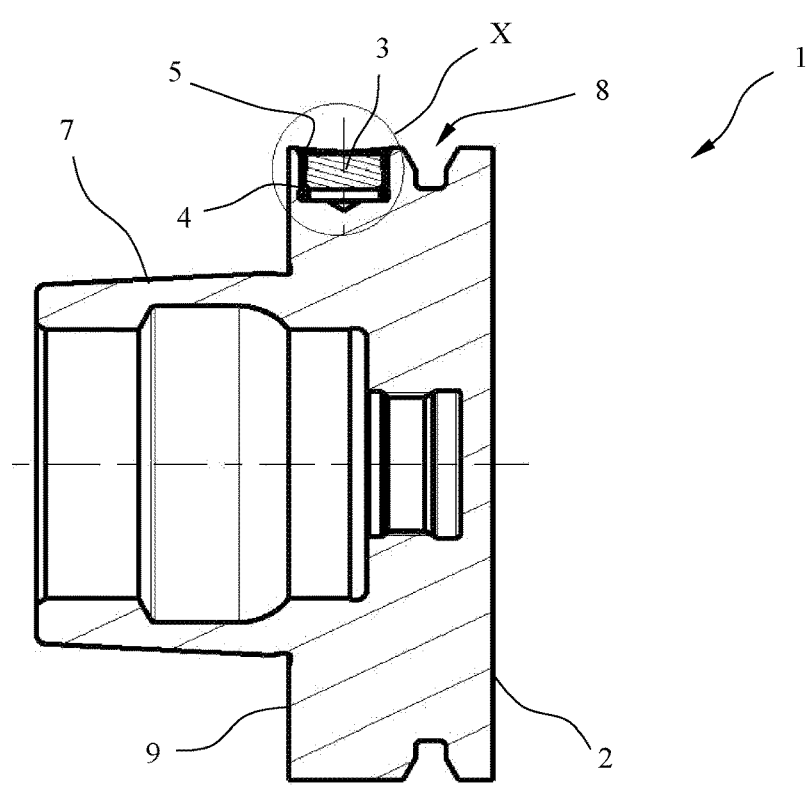
FIG. 2 shows a longitudinal section through the tool system of FIG. 1.

A longitudinal section through the tool system 1 of FIG. 1 is shown in FIG. 2. As can be deduced from FIG. 2, the recess 5 in the tool holder 2 is arranged between a taper shank 7 and a gripper groove 8 for the automatic tool change, especially between a flat surface 9 and the gripper groove 8. This ensures that the data carrier 3 can be read out in the recess 5 at any time, especially when a tool holder 2 is also mounted in a machine spindle (not shown).

The tool holder 2 can also have a shrink-fit chuck or a collet chuck on the right side (not further detailed) with which a tool can be engaged. The described features of the tool holder 2 are universally employable to this extent for all known tool holders.

Figure 3:
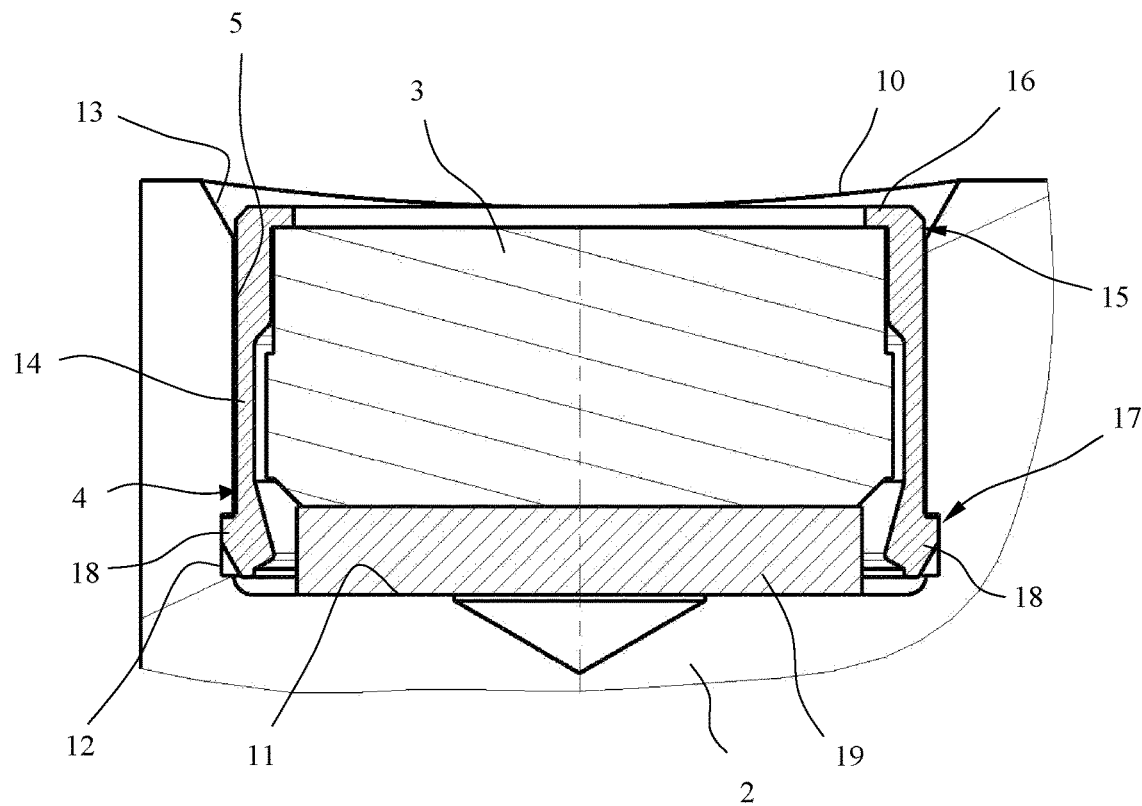
FIG. 3 shows a detail view of area X of FIG. 2.

FIG. 3 shows a detail view of area X of tool holder 2 of FIG. 2. The area of recess 5 in the tool holder 2 is shown in the detail view, in which the data carrier as well as the device 4 for securing the data carrier 3 are arranged. The recess 5 has an outwardly open end 10 and a second end 11 facing away from the open end 10, which forms the bottom of recess 5. In the area of the second end 11, the recess 5 has a notch 12 extending laterally in the tool holder 2, which is designed as an annular groove. In the area of the first end 10, the recess 5 also has an entry chamfer 13 in order to facilitate installation of the device 4, described in detail below.

The device 4 for securing the data carrier 3 on the tool holder 2 has a sleeve-shaped main body 14, which has a radially inwardly projecting projection 16 designed as a peripheral annular ridge on a first end 15. The sleeve-shaped main body 14 has an inside diameter corresponding to the outside diameter of the data carrier 3, so that the data carrier 3 can be guided in positive-locking fashion into the sleeve-shaped main body 14. The radially inwardly projecting projection 16 on the first end 15 of the sleeve-shaped main body 14 forms a stop for the data carrier 3.

On a second end 17 opposite the first end 15, the sleeve-shaped main body 14 has several radially outwardly projecting projections 18 that engage as hook-like elements in the notch 12 in recess 5 of the tool holder 2.

A spacer element 19 is also provided between the data carrier 3 and the second end 11 of recess 5, i.e., the bottom of recess 5, which is designed preferably as an elastic plastic element and acts on the data carrier 3 in the direction of the radially inwardly projecting projection 16. The data carrier is thereby reliably held in a position close to the first end of recess 10, i.e., the outside of the tool holder 2. The spacer element 19, however, can also be designed as an O-ring, for example, from an elastic material, like rubber.

Figure 4:
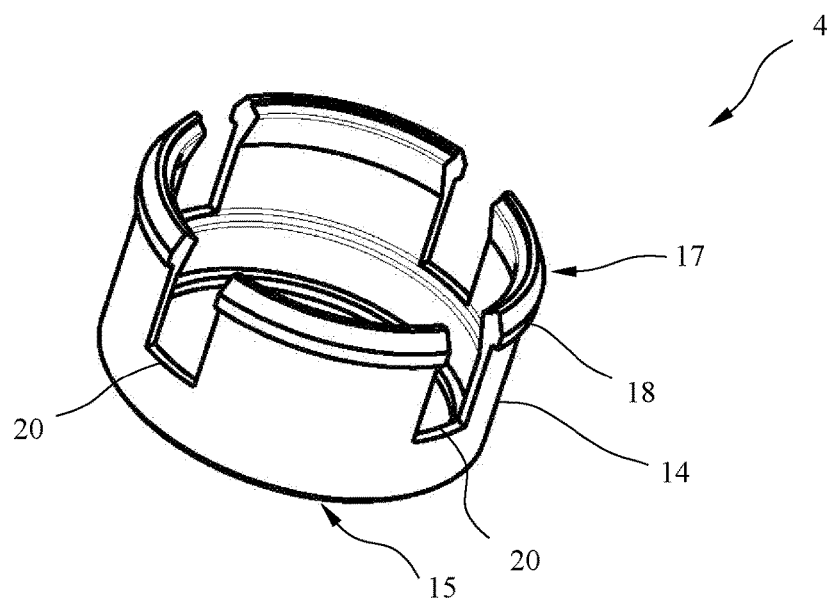
FIG. 4 shows a perspective view of the device for securing a data carrier.

The device 4 in FIG. 4 for securing a data carrier is shown in a first perspective view on the second end 17. As can be deduced from FIG. 4, several radially outwardly projecting projections 18 distributed uniformly in the peripheral direction are provided in the area of the second end 17 of the sleeve-shaped main body 14, each of which are formed by a radially outwardly projecting ridge running in the peripheral direction.

Slits 20 are provided in the sleeve-shaped main body 14 in the peripheral direction between the radially outwardly projecting projections 18. The slits 20 then extend in the direction of the first end 15 of the sleeve-shaped main body 14 starting from the second end 17 of the sleeve-shaped main body 14. The slits 20 then each form a pocket opened toward the second end 17 of the sleeve-shaped main body 14. The elastic radial mobility of the radially outwardly projecting projections 18 on the second end 17 of the sleeve-shaped main body 14 are influenced by the slits 20. Depending on the choice of material for device 4 and the geometry of device 4, especially the wall thickness of the sleeve-shaped main body 14, the radial elasticity of the radially outwardly projecting projections 18 can be adjusted by means of the length and also width of the slits 20.

Figure 5:
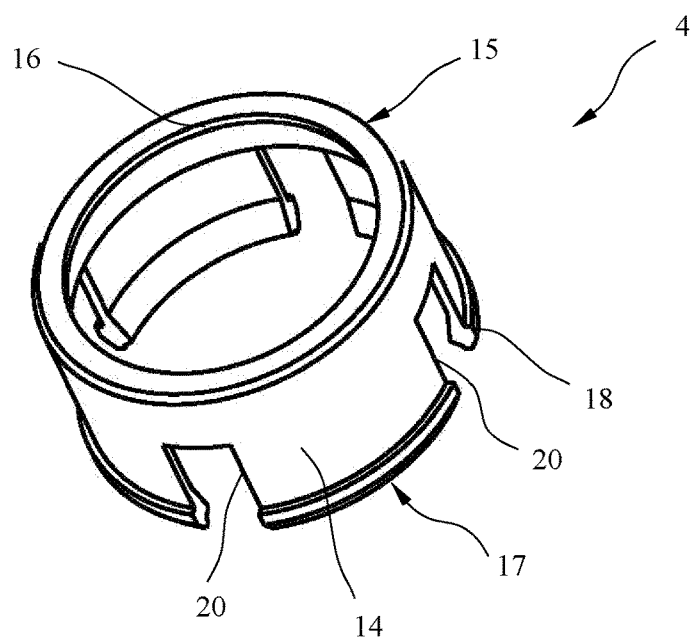
FIG. 5 shows another perspective view of the device for securing a data carrier and FIG. 6 shows a perspective view of the assembly sequence of the tool system of FIG. 1.

The device 4 for securing a data carrier 3 is shown in FIG. 5 in a second perspective view on the first end 15. As can be deduced from FIG. 5, the radially inwardly projecting projection 16 is designed as a peripheral annular ridge on the first end of the sleeve-shaped main body 14. Otherwise, the sleeve-shaped main body 14 has a cylindrical external contour, beyond which only the projections 18 project radially outwards on the second end of the sleeve-shaped main body 14.

Figure 6:
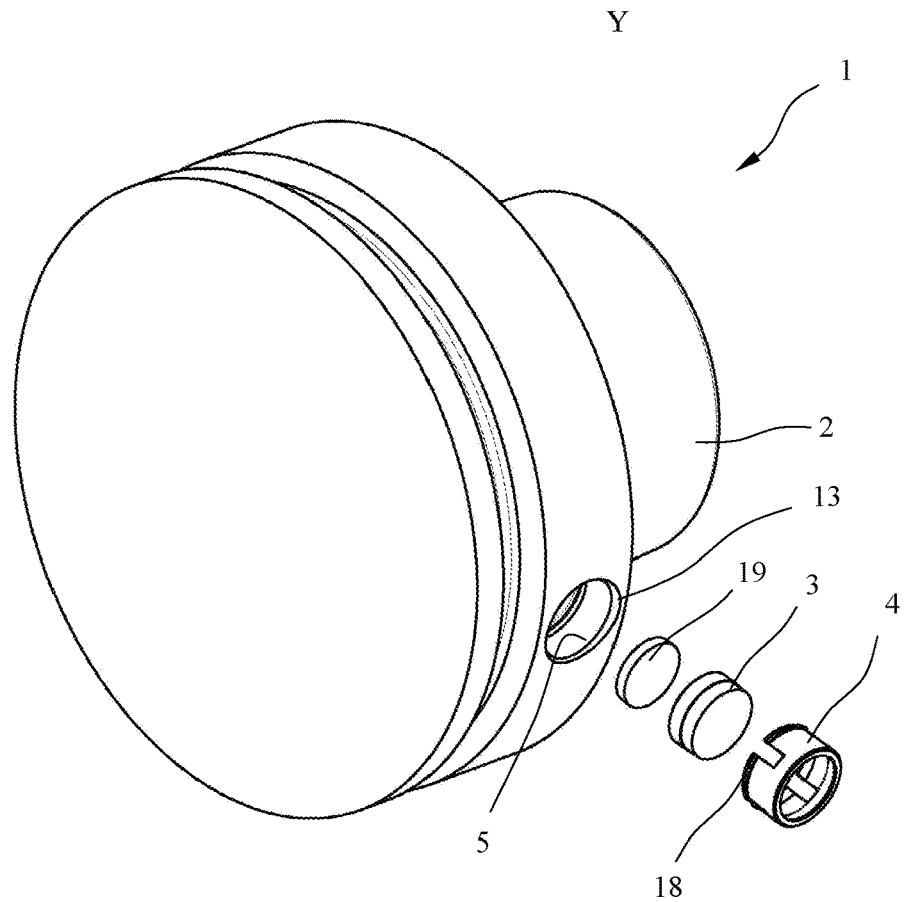

A perspective view of the assembly sequence of the tool system 1 of FIG. 1 is shown in FIG. 6. Rapid assembly is achieved in that the data carrier 3 is first inserted into device 4. The spacer element 19 can already be pre-mounted on the data carrier 3 or mounted in a subsequent step. Since the connection between the data carrier 3 and the spacer element 19 is only relevant for assembly, simple gluing methods are suitable for this purpose. In the subsequent assembly step, the device with the data carrier and the spacer element, which can be prefabricated particularly well in this assembly are inserted into the recess 5 in the tool holder 2.

The inside diameter of the recess 5 essentially corresponds to the outside diameter of the sleeve-shaped main body 14 of device 4 plus the usual assembly play. During insertion of device 4 into recess 5, the radially outwardly projecting projections 18 on the sleeve-shaped main body 14 are elastically deformed radially inwards due to the larger outside diameter relative to the inside diameter of recess 5, supported by the entry chamfer 13. If the device 4 is fully inserted into recess 5, the projections 18 spring radially outwardly into the notch 12 and recess 5 and engage behind it. The holding force of the device 4 can be simply influenced due to the formation of slit 20, the wall thickness of the sleeve-shaped main body 14, the material choice, and the choice of outside diameter with radially outwardly projecting projections 18.

LIST OF REFERENCE NUMBERS

1 Tool system
2 Tool holder
3 Data carrier
4 Device for securing of the data carrier
5 Receptacle/recess in the tool holder
6 Locking device
7 Taper shank
8 Gripper groove
9 Flat surface
10 First end of the recess
11 Second end of the recess
12 Notch in the recess
13 Entry chamfer
14 Sleeve-shaped main body
15 First end of the sleeve-shaped main body
16 Projection projecting radially inwards
17 Second end of sleeve-shaped main body
18 Projection projecting radially outwards
19 Spacer element
20 Slit

The invention claimed is:

1. A tool system comprising:
a tool holder, a data carrier, and a device for securing the data carrier to the tool holder,
wherein the tool holder includes a receptacle for the data carrier, in which the receptacle is formed by an outwardly open recess in the tool holder, the recess having a notch extending laterally in the tool holder, the notch positioned near a second end of the recess facing away from an open first end of the recess;
wherein the tool holder further includes a taper shank for being held by a machining spindle;
wherein the device includes a sleeve-shaped main body with open first and second ends, at least one radially inwardly projecting projection on the first end of the body extending toward a longitudinal axis of the main body, and a plurality of radially outwardly projecting projections in the area of the second end of the body opposite the first end of the body extending away from the longitudinal axis of the main body,
wherein the main body has an inner dimension corresponding to an outer dimension of the data carrier such that the data carrier is holdable in the main body with the at least one radially inwardly projecting projection maintaining the data carrier in the main body,
wherein a spacer element is arranged between the second end of the recess in the tool holder and the data carrier, the spacer element configured and dimensioned to maintain the data carrier in contact with the at least one radially inwardly projecting projection, and
wherein slits are provided in the sleeve-shaped main body in a peripheral direction between the plurality of radially outwardly projecting projections with the slits extending through the main body from an outer surface of the main body to an inner surface of the main body, such that as the main body is inserted in the recess, the plurality of radially outwardly projecting projections flex toward the longitudinal axis of the main body and flex outward as the second end of the main body reaches the second end of the recess so that the plurality of radially outwardly projecting projections flex away from the longitudinal axis of the main body to hook into the notch.

2. The tool system of claim 1, wherein the at least one radially inwardly projecting projection of the main body is formed by a radially inwardly projecting peripheral annular ridge extending toward the longitudinal axis of the main body.

3. The tool system of claim 1, wherein the plurality of radially outwardly projecting projections of the main body are designed to be elastically movable in a radial direction with respect to the longitudinal axis of the main body.

4. The tool system of claim 1, wherein the plurality of radially outwardly projecting projections are spaced apart from each other.

5. The tool system of claim 4, wherein each of the plurality of radially outwardly projecting projections is formed by a radially outwardly projecting ridge running in a peripheral direction with respect to the longitudinal axis of the main body.

6. The tool system of claim 1, wherein the recess is formed as a hole.

7. The tool system of claim 1, wherein the notch, which extends laterally in the tool holder, is designed as an annular groove.

8. The tool system of claim 1, wherein the spacer element is an elastic plastic element.

9. The tool system of claim 1, wherein the spacer element is designed as an O-ring.

\* \* \* \* \*